Dec. 6, 1927.

G. H. HIGGINS

RING GROOVING MACHINE

Filed March 21, 1925

Inventor:
George H. Higgins
By Wilson & McKenna
Attys.

Dec. 6, 1927.

G. H. HIGGINS

RING GROOVING MACHINE

Filed March 21, 1925

Dec. 6, 1927.
G. H. HIGGINS
RING GROOVING MACHINE
Filed March 21, 1925
1,651,598
3 Sheets-Sheet 3
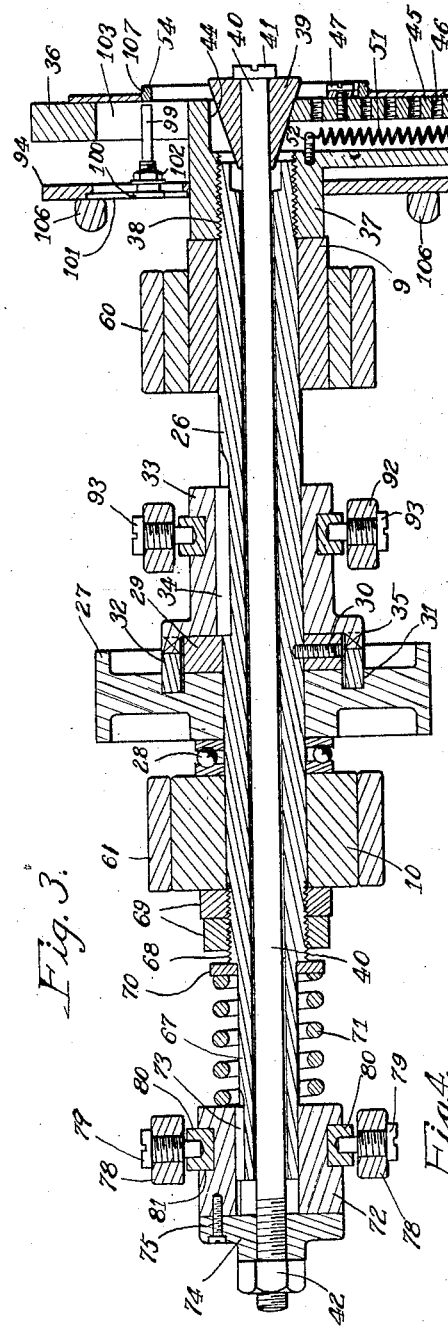
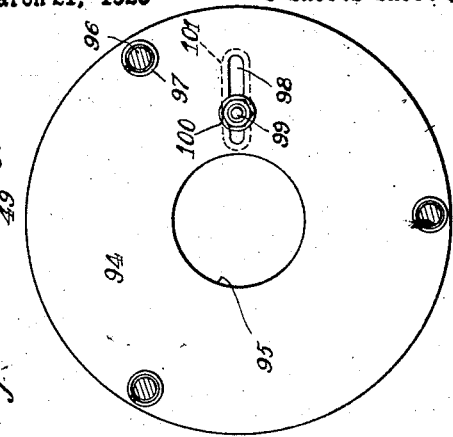
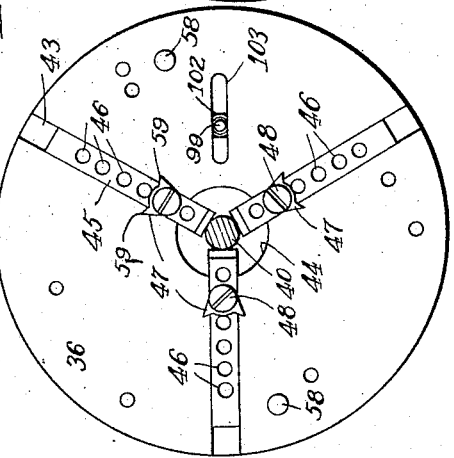
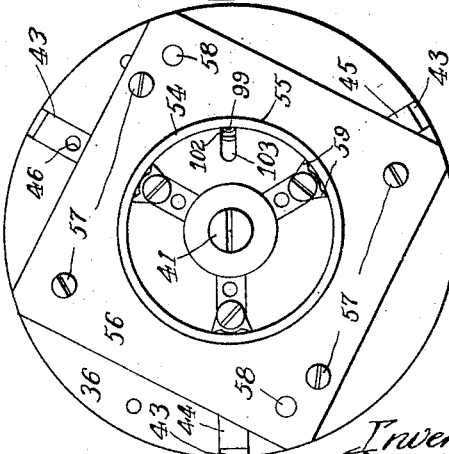
Inventor
George H. Higgins
By Wilson & McLaren
Attys.

Patented Dec. 6, 1927.

1,651,598

UNITED STATES PATENT OFFICE.

GEORGE H. HIGGINS, OF ROCKFORD, ILLINOIS, ASSIGNOR TO BURD HIGH COMPRESSION RING COMPANY, OF ROCKFORD, ILLINOIS, A CORPORATION OF ILLINOIS.

RING-GROOVING MACHINE.

Application filed March 21, 1925. Serial No. 17,166.

This invention relates to metal working machines and the object of the invention is to devise a special machine for grooving piston rings or like objects to produce oil grooves, or to otherwise machine the peripheral portion of a piston ring.

A further object of the invention is to provide a ring grooving machine or lathe having novel means for holding and releasing the rings and for accommodating rings of different sizes and expeditiously grooving the same.

Another and important object of the invention is to provide a ring grooving machine of a kind resembling the vertical or upright knee-type milling machine having an adjustable cutter supported on a traveling table together with a work-holder, including a face plate adapted to be rotated and provided with ring-holding means adapted to grip the work or release the same, and a clutch for transmitting rotation from a driving means or pulley to rotate the work in engagement with the cutting tool, in a predetermined or timed relation.

A further object of the invention is to provide novel control means for engaging the drive clutch after the work-holding means has been acted upon to clamp the ring, and for releasing the drive clutch before shifting the work-holding means or spreader cone to permit the movable clamping jaws to contract and release the ring, whereby the work will be held for action thereon by the cutter before being driven, and the driving means rendered inoperative or disconnected prior to the release of the ring after the oil groove has been cut therein, thereby facilitating and expediting the work.

The invention also comprehends the provision of a single control lever for releasing or engaging the clutch between the driving pulley and the spindle of the machine, and for gripping and releasing the ring, which means permits a spring to actuate a cone or spreader to move the jaws into clamping relation or to release the same against the action of said spring after the clutch has been disengaged, thus reducing the number of operations required of the operator in grooving a ring or carrying on other similar work and providing for economical manufacture and quantity production.

The invention also provides novel means for accommodating rings of different diameters and adjustment of the jaws to clamp the rings irrespective of their size, within certain predetermined limits, and means for ejecting the rings after the work has been completed, said latter means also being adjustable according to the size of the ring.

Other objects and attendant advantages will be appreciated by those skilled in this art as the invention becomes better understood by reference to the following description when considered in connection with the accompanying drawings, in which—

Fig. 3 is an enlarged horizontal longitudinal sectional view taken on the plane of the section line 3—3 of Fig. 1.

Fig. 4 is an enlarged front elevation of the face plate and work-holding means carried thereby with a ring in position.

Fig. 5 is a front elevation of the face plate with the jaws in a released position, and Fig. 6 is a front elevation of an annular back-plate and kick-out pin carried thereby and constituting a part of the work-ejecting means.

Figure 1:
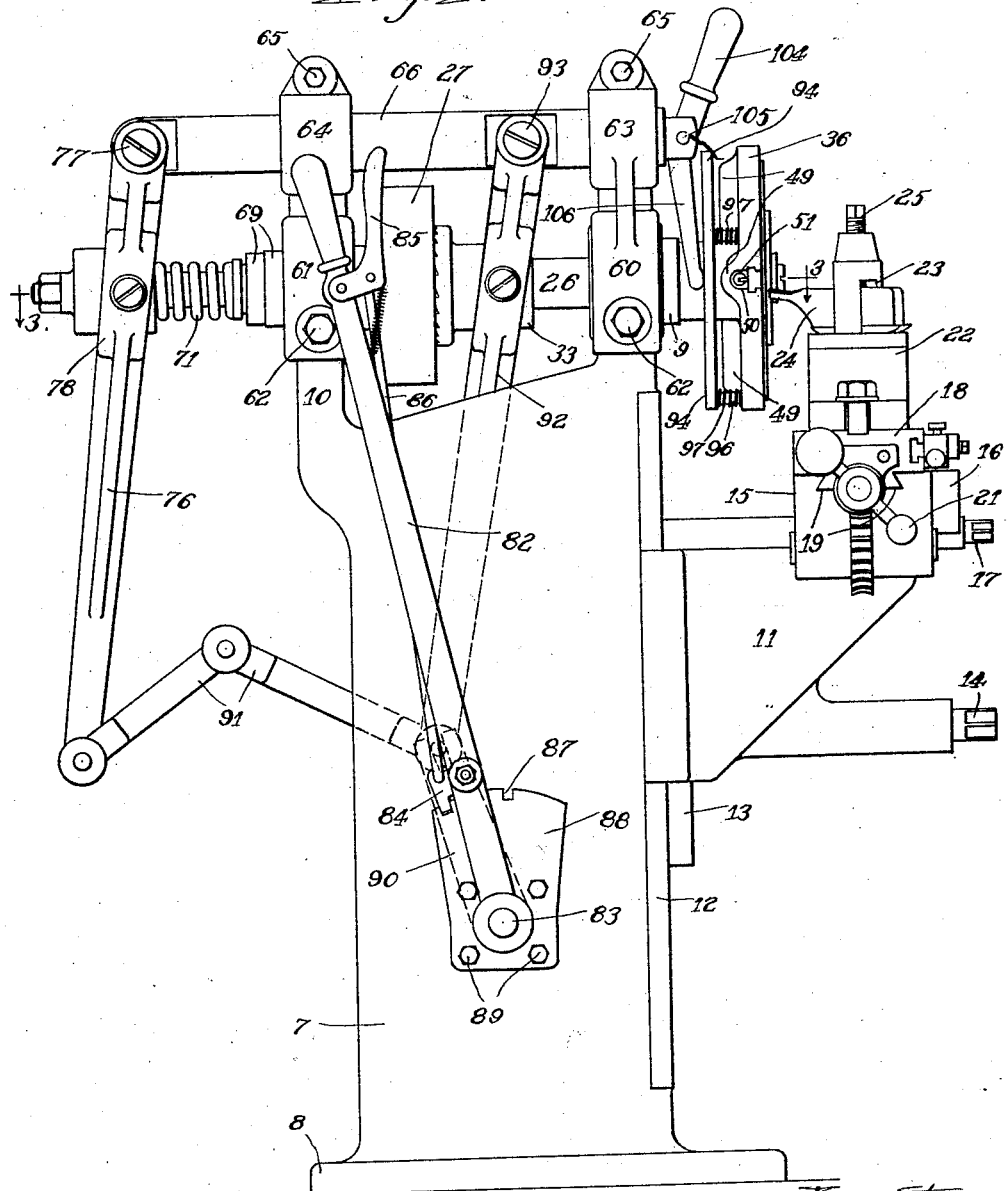
Figure 1 is a side elevation of a ring grooving machine constructed in accordance with the invention.
Figure 2:
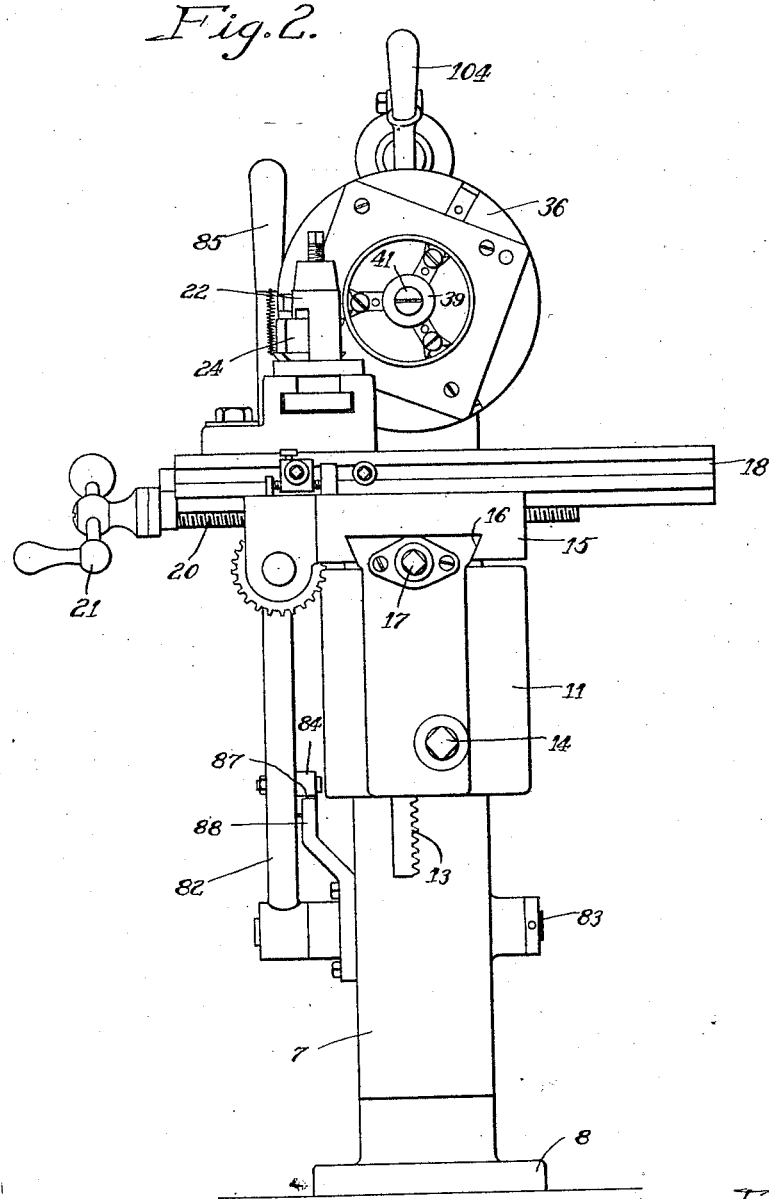
Fig. 2 is a front elevation of the machine.

Referring to the drawings in detail wherein I have illustrated an embodiment of the invention and in which similar reference characters designate corresponding parts throughout, 7 designates an upright frame having a base 8 resting on the floor and formed with spaced front and rear bearings 9 and 10 at its upper end. A knee 11 is adapted to be raised or lowered on guideways 12 provided at the front of the frame, through the medium of a vertical rack 13 and a shaft 14 having a pinion in engagement with the rack at the inner end and adapted to be turned by a crank in the usual manner common in the upright or vertical knee-type milling machine. A horizontal carriage 15 is mounted upon the knee 11 for adjustment forwardly and rearwardly on the guideway 16 through the medium of a screw feed or other suitable device designated at 17 and adapted to be operated by a suitable hand crank. A horizontal carriage 18 is mounted for transverse movement in guideways 19 on the carriage 15 and is adapted to be held in adjusted position by a feed screw 20 having an operating handle or crank 21. Thus the carriages 15 and 18 are adjustable at right angles to each other according to the size or diameter of the work, the depth or thickness thereof, and the point of action of the cutter thereon. A tool holder 22 is mounted upon the carriage 18 for movement therewith and, as indicated, has a slot 23 for receiving the tool 24 which is held in position by the set screw 25, with the cutting edge of the tool extending inwardly at an angle.

A hollow or tubular spindle 26 is journaled in the bearings 9 and 10 and has a drive pulley 27 loose thereon and adapted to be driven suitably by a belt trained thereon. An antifriction bearing 28, is interposed between the hub of the pulley 27 and the forward edge of the sleeve bearing 10 to take end thrust on the pulley. The opposite face of the pulley is abutted by a ring 29 anchored to the spindle 26 as by a screw 30 to prevent the pulley shifting forwardly on the spindle. The adjacent face of the pulley, outwardly of the ring 29, is provided with an annular groove 31 for receiving a fixed clutch ring 32. A clutch collar 33 is splined at 34 on the spindle 26 and has a flanged clutch rim 35 co-acting with the clutch ring 32. These parts form sections of a clutch adapted to be engaged for imparting rotation from the pulley 27 to the spindle, and disengaged for permitting the spindle 26 to remain stationary.

A face plate 36 is fixed to the forwardly extended end of the spindle 26 adjacent the bearing 9 and, as shown, is provided with a rearwardly extending hub or sleeve portion 37 having threaded connection with the spindle as indicated at 38. The face plate is centrally apertured to receive a spreader in the form of a cone 39 mounted on the forward end of a rod or bolt 40 in contact with the head 41, which rod extends through the bore of the spindle to a point beyond the rear end thereof and has a nut 42 mounted thereon. The face plate 36 is also provided with a plurality of radial grooves 43, preferably three in number, communicating with the central opening 44 in the plate which receives the spreader or cone 39. Elongated jaw carriers 45 are slidably mounted in the grooves 43 and are provided with a series of threaded sockets or openings 46, in which jaws 47 may be adjustably mounted by screws 48, thus permitting radial adjustment of the work clamping jaws 47 to accommodate rings or other similar objects of different diameters. The wall of the face plate 36 is thickened or formed with rearward radial projections in back of each groove 43 and the jaw carriers and jaws are held therein, as indicated at 49. These thickened portions are also bored or hollowed out to provide radial cavities 50, in which contractile springs 51 are received. These springs are anchored at their inner ends to the face plate hub as indicated at 52, as by means of apertured screws, and are similarly anchored at their outer ends, as indicated at 53, to the jaw carriers 45. The springs therefore tend to normally hold the jaws inwardly or in contracted relation to disengage from the inner face of a ring 54 adapted to be gripped internally by the jaws when moved outwardly in expanded relation. The ring is held in the central circular opening 55 of a plate 56 secured as at 57 to the front of the face plate 36 upon being properly centered and held as by means of the dowel pins 58. This plate is of such thickness as to permit the ring 54 to project forwardly therefrom as clearly indicated in Fig. 3 of the drawings so that the peripheral edge of the ring will be exposed for action thereon by the cutter 24. The opening in the plate is gauged in the manner of a permanent gauge plate of this type, to accommodate a standard sized ring, or plates with different sized openings may be employed for receiving different sized rings and anchored to the face plate in the manner explained or in any other suitable way. It will be noted that the plate 56 is secured flat against the face plate and provides a seat in conjunction therewith for accommodating the ring. The latter which is held by the sharp projections 59 of the jaws 47 when the latter are brought into action or expanded by the spreader cone 39 by shifting the rod 40 longitudinally.

Split clamps 60 and 61 are secured to the bearings 9 and 10 by screws 62 and project above the same, the clamps being of double or dual formation having clamping sleeves 63 and 64 above the clamps 60 and 61 bolted together above, as indicated at 65, and adapted to clamp and hold a horizontal support 66 therein in a plane parallel to the spindle 26 and above the same.

As seen in Fig. 3 of the drawings, the hub 37 of the face plate 36 engages the forward end of the bearing 9 for additionally taking up end thrust, though the bearings 28 are primarily provided for this purpose and clearance may be allowed between the bearing 9 and the hub 37. The rear end of the spindle is reduced as indicated at 67 and externally threaded immediately forwardly thereof, as indicated at 68, to take lock nuts 69, which take up forward end thrust of the spindle against the bearing 10, thus effectively holding the spindle against longitudinal displacement and permitting convenient mounting and assembly of the parts associated therewith.

A washer 70 is mounted on the reduced portion 67 in contact with the shoulder formed thereby and an expansion spring 71 is mounted on the reduced portion of the spindle between the washer and a collar 72 splined at 73 on the rear end of the spindle. The collar is capped by a plate 74 secured to the collar as indicated at 75 and threaded on the rod 40 in abutment with the nut 42, thus fixing the collar to the spreader rod 40 so that when the collar is shifted longitudinally on the spindle similar movement will be imparted to the spreader.

A shifter lever 76 is pivotally hung from the rear end of the support 66 as indicated at 77 and its sleeve portion 78 engages over the collar 72 and has screws 79 mounted in the sides thereof to engage shoes 80 mounted on the reduced inner ends thereof and seated in an annular groove 81 in the periphery of the collar 72 so that the collar is free to turn with the spindle independently of and within the sleeve portion 78 of the shifter lever 76.

A throw lever 82 is pivoted at 83 to the frame 7 and has a latch 84 operable from the handle 85 through a rod 86, coacting with the notches 87 in a segment or latch plate 88 suitably fixed to the side of the frame as indicated at 89. The pivot 83 of the lever extends through the frame and intermediately carries a short arm 90 which has connection at its free end with the lower end of the depending lever 76 through the medium of an articulated connection or toggle 91, preferably consisting of two links pivoted to each other and to the arm and lever 76, respectively. A similar shifter lever 92 is pivoted to the support 66 as at 93 near the clamp 63 and is connected to the clutch collar 33 in the same manner that the lever 76 has connection with the collar 72. The lower end of the lever 92 is also connected to the free end of the short arm 90 which latter has its upper end forked for this purpose as seen in Fig. 1. It will also be noted that the levers 76 and 92 are similarly located beneath the axis of the spindle and operate substantially in parallelism.

An annular back-plate 94 is slidably mounted at its central opening 95 on the hub or sleeve portion 37 of the face plate 36, and is slidably mounted on pins 96 secured at spaced points to the back of the face plate, the pins being parallel to the axes of these parts and the spindle 26. Expansible springs 97 are mounted on the pins 96 between the plates 36 and 94, and normally force the latter rearwardly or inwardly, guided by the hub 37. The ring 94 is also provided with a radial slot 98 in which a kick-out pin 99 is adjustably secured, the rear end of the pin being headed or enlarged as indicated at 100 to seat in a rabbet 101 in the back of the plate 94, while a nut 102 threaded on the pin permits the latter to be clamped in a radially adjusted position in the slot 98. The pin 99 also extends through a radial slot 103 in the face plate 36 and is adjusted to extend immediately behind the ring 54. A forked hand lever 104 is pivoted at 105 to the forward end of the support 66 and has arms 106 to straddle the hub of the face plate behind the plate 94, as seen in Figs. 1 and 3, so as to constitute a kick-out means for displacing or ejecting the ring from its seat in the plate 56 after the jaws have been released from holding engagement with the inner surface of the ring.

In an operation, the operator adjusts the machine by raising the knee 11 and moving the carriage 15 back and forth and the carriage 18 transversely at right angles thereto, in intersecting planes until the tool holder 22 is so positioned to bring the cutting edge of the tool 24 in cutting position with respect to the periphery of the ring 54 mounted in the seat 55 of the plate 56 carried by the face plate 36. The face plate, in this respect, constitutes the work-carrying means, in contrast to the usual work table provided on milling machines. In inserting the ring 54 in its seat, it is necessary to release the jaws 47 to permit them to contract so that the ring may be inserted and then gripped by the jaws under the expanding action of the spreader 39. The spring 71 normally holds the clutch engaged, the clutch collar 33 being normally moved to the left to mate with the clutch ring 32 of the drive pulley while the collar 72 is also normally moved to the left. This action is permitted by the splined connections with the spindle 26 at 34 and 73 without shifting the spindle so that the parts normally occupy the positions shown in Figs. 1 and 3. The operator grasps the handle of the lever 82 for swinging the lever forwardly from the position in which it is held by the latch when the clutch is engaged. The short arm 90 is thereby swung forwardly and with it the lever 92 to disengage the clutch and permit the spindle 26 to remain stationary. After the clutch has been disengaged, by reason of the differential movement established between the levers 92 and 76 through the articulated or toggle connection formed by the links 91, continued movement of the arm 90 will straighten this connection disposing the links in alignment and moving the lever 76 forwardly against the action of the spring 71. This will shift the rod 40 forwardly and with it the spreader cone 39 so as to permit the springs 51 to act in retracting the jaws. The ring 54 is now inserted in its seat and the operator then throws the lever 82 rearwardly to permit the spring 71 to first act by release of pressure thereon through the loose or differential connection between the arm 90 and the lever 76, thus moving the cone 39 rearwardly to spread the jaws 47 into gripping relation with the inner wall of the ring and in such manner as to firmly hold the same. In predetermined or timed relation or successively thereafter, the lever 92 is shifted rearwardly by its connection with the arm 90 under the positive throw of the lever 82 and engages the clutch by shifting the collar 33. This will transmit rotation from the driven pulley 27 to the spindle 26 so that the latter will be revolved in its bearings and with it the face plate and work carried thereby as well as the spreader to continue to hold the jaws in gripping position. The cutter 24 is then brought into cutting position and as indicated, a V-shaped or other groove 107 is cut in the periphery of the ring for the purpose of catching the oil and forming a seal between the ring, when mounted on a piston, and the wall of the cylinder as it is thought will be readily understood.

When the proper groove has been cut, the operator grasps the handle of the lever 82 and swings it forwardly to first disengage the clutch and operatively disconnect the spindle from the drive means. Upon continued forward movement of the lever, the spring 71 is compressed and the spreader shifted forwardly to release the jaws 47 from the work or inner face of the ring. The operator then pushes rearwardly on the handle of the lever 104 with a quick thrust to impart a forward movement or swing to the fork of the lever against the back-plate 94. The pin 99 kicks or ejects the ring from its operative position in the seat. Another ring may then be inserted in position to be grooved, after which the lever 82 is released under the action of the spring 71 and the same operation repeated.

From the foregoing, it will be manifest that I have provided a very desirable and simple form of machine for cutting grooves in piston rings, or for otherwise machining the peripheral portion of piston rings or the like, which may be embodied in the form of a complete machine and sold as such, or as an adjunct or attachment to known types of milling machines and especially those of the knee or vertical type. In the latter case, it is simply necessary to mount the clamps 60 and 61 in position upon the bearings 9 and 10 by means of the screws 62 with the special assembly of hollow or tubular spindle and parts associated therewith, which together with the operating lever and operative connections, will complete the assembly. By the device, the rings or other similar work to be acted upon may be quickly mounted in position and held by the jaws, the cutting operation expeditiously effected and the work thereafter easily ejected so that manufacture is admirably facilitated and economical and quantity production rendered possible.

While I have described what I now consider to be the preferred embodiment of the invention, it is to be understood that the device is susceptible of wide changes and variations in the construction, arrangement and purposes of the parts as well as the materials used, without departing from the spirit and scope of the invention as will be hereinafter defined in the claims.

I claim:

1. In a machine of the class described, an upright frame, a tool holder adjustable vertically and horizontally on the frame, a cutting tool carried thereby, work-holding means carried by the frame, means for actuating the work-holding means, means for releasing the work, levers controlling the actuating and releasing means, spring means normally rendering the holding means operative, and a throw lever having a direct connection with the lever for the actuating means and a lost motion connection with the lever for the holding means.

2. In a ring grooving machine, a frame, a tool holder adapted for vertical and horizontal adjustment, a tool carried thereby, a hollow spindle journaled in the frame, a support carried by the frame, drive means for the spindle including a clutch for rendering the same operative and inoperative, work-holding means carried by said spindle, a shifter lever pivoted to the support and having connection with said clutch, a second shifter lever pivoted to the support and having connection with said work-holding means, and a control member carried by the frame and having an arm connected to the first shifter lever and a toggle connection with the second shifter lever.

3. In a ring grooving machine, a frame, a tool holder adapted for vertical and horizontal adjustment, a tool carried thereby, a hollow spindle journaled in the frame, a support carried by the frame, drive means for the spindle including a clutch for rendering the same operative and inoperative, a shifter lever pivoted to the support and having connection with said clutch, a second shifter lever pivoted to the support and having connection with said work-holding means, a control member carried by the frame and having a direct connection with the first shifter lever and a lost-motion connection with the second shifter lever, a kick-out device for said work-holding means, and a lever pivoted to the support to operate said kick-out device.

4. In a machine of the class described, a frame, a cutter carried by the frame, a spindle journaled in the frame, means for driving the spindle, a face plate fixed to the spindle, jaw carriers slidable radially on the face plate, jaws adjustable on said carriers and adapted to be moved into and out of clamping position with the work mounted on the face plate, kick-out means rotatable with the face plate and including a radially adjustable pin, and means for shifting the kick-out means to cause the pin to engage and displace the work upon completion of the operation thereon.

GEORGE H. HIGGINS.